United States Patent
Foerster et al.

(10) Patent No.: US 10,282,089 B2
(45) Date of Patent: May 7, 2019

(54) USER STATE-ADAPTIVE TEXT INPUT

(71) Applicant: Google Inc., Mountain View, CA (US)

(72) Inventors: Jakob Foerster, Zurich (CH); Othar Hansson, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 285 days.

(21) Appl. No.: 14/793,070

(22) Filed: Jul. 7, 2015

(65) Prior Publication Data

US 2016/0224240 A1 Aug. 4, 2016

Related U.S. Application Data

(60) Provisional application No. 62/111,521, filed on Feb. 3, 2015.

(51) Int. Cl.
G06F 3/0488 (2013.01)
G06F 3/023 (2006.01)
G06F 3/0482 (2013.01)

(52) U.S. Cl.
CPC ........ *G06F 3/04886* (2013.01); *G06F 3/0237* (2013.01); *G06F 3/0482* (2013.01); *G06F 3/04883* (2013.01)

(58) Field of Classification Search
CPC ............. G06F 3/04886; G06F 3/04883; G06F 3/0237; G06F 3/0482
See application file for complete search history.

(56) References Cited

U.S. PATENT DOCUMENTS

| 9,740,396 B1 * | 8/2017 | Ahaus .................. G06F 3/0488 |
| 2008/0006762 A1 | 1/2008 | Fadell et al. |
| 2009/0133106 A1 * | 5/2009 | Bentley .................. G06F 21/31 726/5 |

(Continued)

FOREIGN PATENT DOCUMENTS

| EP | 2264563 A1 | 12/2010 |
| WO | 2013040493 A1 | 3/2013 |

OTHER PUBLICATIONS

Wang et al., "A Framework of Energy Efficient Mobile Sensing for Automatic User State Recognition," "Proceedings of the 7th International Conference on Mobile Systems, Applications, and Services," Jun. 22-25, 2009, 14 pgs.

(Continued)

*Primary Examiner* — John T Repsher, III
(74) *Attorney, Agent, or Firm* — Shumaker & Sieffert, P.A.

(57) ABSTRACT

In one example, a method includes outputting, by a computing device (102) and for display at a display device (104) operatively coupled to the computing device, a graphical keyboard (124) comprising a plurality of keys, and receiving, by the computing device, an indication of a gesture detected at a presence-sensitive input device operatively coupled to the computing device. In this example, the method also includes detecting, by one or more sensors (154) of the computing device, data indicative of one or more user states determined to affect gesture accuracy; selecting, by the computing device and based at least in part on the indication of the gesture and the data, a particular candidate string; and outputting, by the computing device and for display at the display device, the particular candidate string.

16 Claims, 6 Drawing Sheets

(56) References Cited

U.S. PATENT DOCUMENTS

| | | | |
|---|---|---|---|
| 2009/0195506 A1* | 8/2009 | Geidl | G06F 3/0237 |
| | | | 345/168 |
| 2011/0248948 A1* | 10/2011 | Griffin | G06F 3/041 |
| | | | 345/174 |
| 2013/0046544 A1* | 2/2013 | Kay | G06F 3/04883 |
| | | | 704/275 |
| 2014/0032218 A1 | 1/2014 | Yeung | |
| 2014/0082545 A1 | 3/2014 | Zhai et al. | |
| 2014/0115521 A1 | 4/2014 | Kataoka et al. | |
| 2014/0142926 A1* | 5/2014 | Jones | G06F 17/276 |
| | | | 704/10 |
| 2014/0164973 A1 | 6/2014 | Greenzeiger et al. | |
| 2014/0297267 A1* | 10/2014 | Spencer | G06F 17/276 |
| | | | 704/9 |
| 2015/0143234 A1* | 5/2015 | Norris, III | G06F 17/24 |
| | | | 715/256 |

OTHER PUBLICATIONS

International Preliminary Report on Patentability from International Application No. PCT/US2016/013560, dated Aug. 18, 2017, 10 pp.
Communication Pursuant to Rules 161(1) and 162 EPC dated Sep. 1, 2017 from counterpart European Application No. 16701898.5, 2 pp.
Response to Communication under Rules 161(1) and 162 EPC dated Sep. 1, 2017, from counterpart European Application No. 16701898.5, filed Feb. 16, 2018, 11 pp.

* cited by examiner

USER STATE-ADAPTIVE TEXT INPUT

RELATED APPLICATION

This application claims the benefit of U.S. Provisional Application No. 62/111,521, filed Feb. 3, 2015, the entire content of which is hereby incorporated by reference.

BACKGROUND

Some computing devices provide a virtual keyboard as part of a user interface for text entry. For instance, a touchscreen included in or coupled to a computing device may output a graphical keyboard that enables a user to enter data by indicating keys displayed at the presence-sensitive display. A computing device that provides a graphical keyboard may utilize word prediction, auto-correction, and/or suggestion techniques for determining a word from a user input.

In some cases, the computing device may present a graphical keyboard with which a user can interact by tapping individual keys of the keyboard or by sliding a finger over successive regions associated with desired keys. In this way, graphical keyboards provide an input method that allows a user to enter characters, words, or groups of words by entry of one or more touch gestures. As such, a virtual keyboard may allow a user to quickly and accurately enter text into a computing device.

There are, however, opportunities to improve keyboards to correctly determine keys and/or words intended to be input by the user, resulting in more accurate text entry.

BRIEF DESCRIPTION OF DRAWINGS

The details of one or more examples of the disclosure are set forth in the accompanying drawings and the description below. Other features, objects, and advantages will be apparent from the description and drawings, and from the claims.

DETAILED DESCRIPTION

In general, techniques of this disclosure are directed to determining candidate strings in response to user input, in particular using one or more user states detected by a computing device. By selecting candidate strings based at least in part on one or more detected user states, techniques of this disclosure may enable a computing device to reduce the effects that the one or more detected user states have on text entry accuracy.

In some examples, one or more different user states may influence the accuracy of user input gestures relative to the user's intended input gesture. Some example user states which may affect gesture accuracy include (but are not limited to) activities engaged in by the user (e.g., walking, running, cycling, playing a sport, exercising, and being present aboard a moving apparatus), and hand-eye coordination impairment states affecting the user (e.g., ambient temperature, an intoxication state of the user, attire worn by the user, etc.).

In accordance with one or more techniques of this disclosure, a computing device may receive an indication of a gesture performed by a user and determine one or more user states associated with gesture accuracy. For instance, the computing device may user various sensors and communication components to determine that the user is walking and wearing gloves. The computing device may account for the degree to which the gesture accuracy is affected by the user state by modifying the respective probabilities of one or more candidate text strings. Accordingly, the computing device may select a particular candidate string based at least in part on the gesture and the one or more determined user states. In this way, the computing device may more accurately determine and predict character strings intended by the user based on the user state thereby allowing the computing device to infer text input more accurately.

Figure 1:
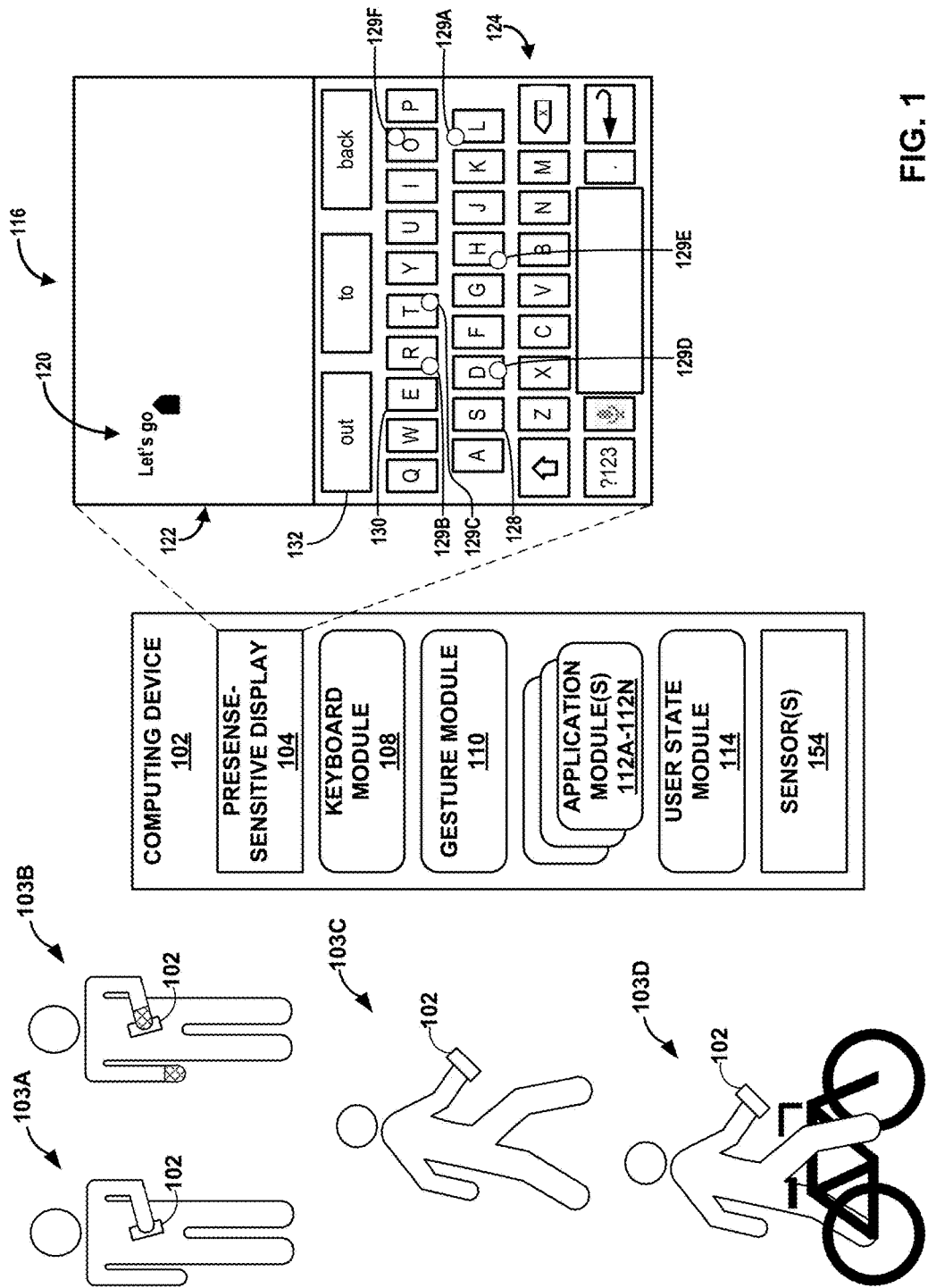
FIG. 1 is a block diagram illustrating an example computing device that selects candidate strings based on one or more detected user states, in accordance with one or more techniques of the present disclosure.

FIG. 1 is a block diagram illustrating an example computing device 102 that selects candidate strings based on one or more detected user states, in accordance with one or more techniques of the disclosure. In some examples, computing device 102 may be associated with a user. A user associated with computing device 102 may interact with computing device 102 by providing various user inputs to the computing device. In some examples, a user may have one or more accounts with one or more services, such as a social networking service and/or telephone service, and the accounts may be registered with computing device 102.

Figure 2:
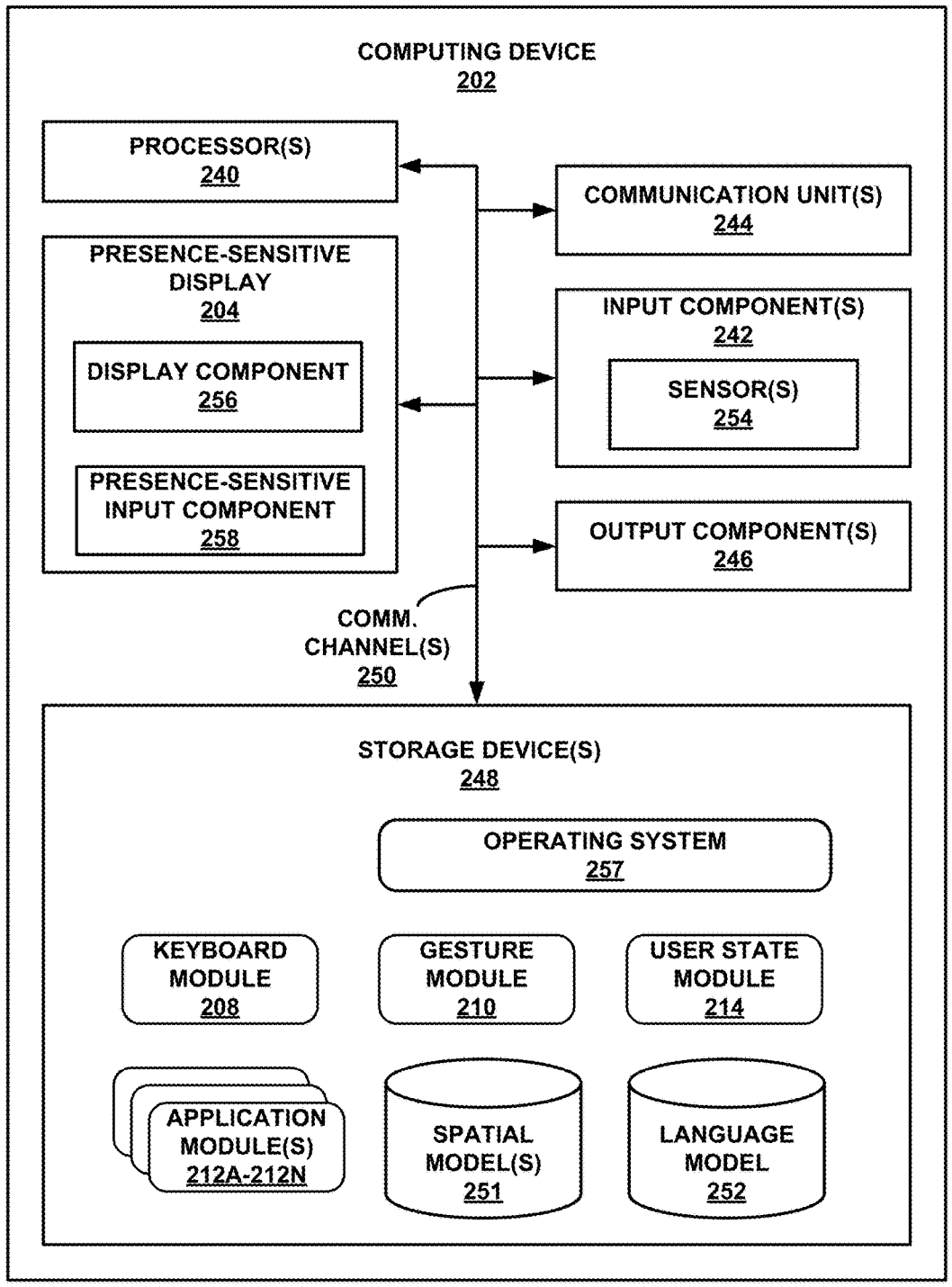
FIG. 2 is a block diagram illustrating further details of one example of a computing device shown in FIG. 1, in accordance with one or more aspects of the present disclosure.

Examples of computing device 102 may include, but are not limited to, portable or mobile devices such as mobile phones (including smart phones), wearable computers (also called smartwatches), laptop computers, desktop computers, tablet computers, smart television platforms, personal digital assistants (PDAs), remote controllers, gaming systems, servers, mainframes, etc. As shown in the example of FIG. 1, computing device 102 may be a smartphone. Computing device 102, in some examples, can include a presence-sensitive display 104, keyboard module 108, gesture module 110, application modules 112A-112N ("application modules 112"), and user state module 114. Other examples of a computing device 102, e.g., as shown in FIG. 2, that implement techniques of the disclosure may include additional components not shown in FIG. 1.

Computing device 102 may include presence-sensitive display 104. Presence-sensitive display 104 of computing device 102 may function as both an input component and as an output component for computing device 102. Presence-sensitive display 104 may be implemented using various technologies. For instance, presence-sensitive display 104 may function as a presence-sensitive input component using a presence-sensitive screen, such as a resistive touchscreen, a surface acoustic wave touchscreen, a capacitive touchscreen, a projective capacitance touchscreen, a pressure sensitive screen, an acoustic pulse recognition touchscreen, a camera and display system, or another presence-sensitive screen technology. Presence-sensitive display 104 may function as an output component, such as a display device, using any one or more of a liquid crystal display (LCD), dot matrix display, light emitting diode (LED) display, organic light-emitting diode (OLED) display, e-ink, or similar monochrome or color display capable of outputting visible information to the user of computing device 102.

Presence-sensitive display 104 of computing device 102 may include a presence-sensitive screen that can receive tactile user input from a user of computing device 102 and present output. Presence-sensitive display 104 may receive indications of the tactile user input by detecting one or more tap and/or non-tap gestures from a user of computing device 102 (e.g., the user touching or pointing at one or more locations of presence-sensitive display 104 with a finger or a stylus pen) and in response to the input, computing device 102 may cause presence-sensitive display 104 to present output. Presence-sensitive display 104 may present the output as part of a user interface (e.g., graphical user interface (GUI) 16) which may be related to functionality provided by computing device 102.

As shown in FIG. 1, computing device 102 may also include gesture module 110. In some examples, gesture module 110 may be configured to receive gesture data from presence-sensitive display 104 and process the gesture data. For instance, gesture module 110 may receive data from presence-sensitive display 104 indicating a gesture input by a user at presence-sensitive display 104. Gesture module 110 may determine that the input gesture corresponds to a tap gesture, a swipe gesture, a cursor movement gesture, a selection gesture, or other gesture. In some examples, gesture module 110 determines one or more alignment points that correspond to locations of presence-sensitive display 104 that are touched or otherwise detected in response to a user gesture. In some examples, gesture module 110 can determine one or more features associated with a continuous gesture, such as the Euclidean distance between two alignment points, the length of a gesture path, the direction of a gesture, the curvature of a gesture path, maximum curvature of a gesture between alignment points, speed of the gesture, etc. A continuous gesture may be a gesture that begins at a first location and continues while being detected by computing device 102 to a second, different location of presence-sensitive display 104, such that the continuous gesture is no longer detected upon reaching the second, different location. Gesture module 110 may send processed data to other components of computing device 102, such as application modules 112, keyboard module 108, etc.

Computing device 102, in some examples, includes keyboard module 108. Keyboard module 108 may include functionality to generate, for display, a virtual or graphical keyboard 124. Keyboard module 108 also receives and/or processes input data, such as indications of gesture input to select one or more keys of the graphical keyboard 124. For example, keyboard module 108 may receive data representing inputs of certain taps, keystrokes, gestures, etc., from gesture module 110 that were inputted by a user as tap gestures and/or continuous swiping gestures via a graphical keyboard 124 displayed at presence-sensitive display 104. Keyboard module 108 may process the received keystrokes and determine selected characters, words, strings, etc., based on input features such as, received input locations, input duration, input speed, input direction, etc. Keyboard module 108 may also function to send character, word, and/or character string data to other components associated with computing device 102, such as application modules 112, gesture module 110, etc. That is, keyboard module 108 may, in various examples, receive input data from gesture module 110, process the input data to determine characters, text, strings, etc., and provide the data to application modules 112.

Computing device 102, in some examples, includes one or more application modules 112. Application modules 112 may include functionality to perform any variety of operations on computing device 102. For instance, application modules 112 may include a word processor, spreadsheet, web browser, contacts list, one or more messaging applications (e.g., text messaging, instant messaging, email, etc.), multimedia player, server application, operating system, distributed computing application, graphic design application, video editing application, web development application, notification application etc. As described in the example of FIG. 1, application module 112A may include functionality of an email application that displays graphical content. Such graphical content may include a text editor control 122 and graphical keyboard 124, which are each included in GUI 116. In the example of FIG. 1, application module 112A may enable a user to read email, compose, and send email, etc.

In some examples, computing device 102 may include one or more sensors 154. One or more of sensors 154 may measure one more measurands. Examples of one or more of sensors 154 may include one or more location sensors (e.g., a global positioning system (GPS) sensor, an indoor positioning sensor, or the like), one or more motion/orientation sensors (e.g., an accelerometer, a gyroscope, or the like), a light sensor, a temperature sensor, a pressure (or grip) sensor, a physical switch, a proximity sensor, and one or more bio-sensors that can measure properties of the skin/blood, such as alcohol, blood sugar etc.

As shown in FIG. 1, GUI 116 may be a user interface generated by one or more of keyboard module 108 and application module 112A that allows a user to interact with computing device 102. GUI 116 may include graphical content. Graphical content, generally, may be any visually displayable representation in GUI 116. Examples of graphical content may include graphical objects, text, images, a group of moving images, characters, symbols, etc. As shown in FIG. 1, GUI 16 includes a text editor control 122 and graphical keyboard 124.

As shown in FIG. 1, text editor control 122 may display text content entered by a user, generated by computing device 102, and/or received by computing device 102 from a another computing device that is operably coupled to computing device 102. For purposes of illustration in FIG. 1, text content may include "Let's go" 120. Keyboard module 108 may cause presence-sensitive display 104 to display text editor control 122 with the included text content.

Graphical keyboard 124 may be displayed by presence-sensitive display 104 as a set of selectable keys. Keys may represent a single character from a character set (e.g., letters of the English alphabet), or may represent combinations of characters. One example of a graphical keyboard may include a traditional "QWERTY" keyboard layout. Other examples may contain characters for different languages, different character sets, or different character layouts. As shown in the example of FIG. 1, graphical keyboard 124 includes a version of the traditional "QWERTY" keyboard layout for the English language providing character keys as well as various keys (e.g., the "up arrow" key that provide "shift" functionality) providing other functionality. Example keys include "E" key 130 and "S" key 128. In some examples, graphical keyboard 124 includes one or more word suggestions, such as word suggestion 132 that includes the word "out."

In accordance with techniques of the disclosure, computing device 102 may implement a user state module 114 to improve the accuracy of user selections at keyboard 124. User state module 114, as described in this disclosure, may select one or more user states associated with gesture accuracy. User state module 114 may select the one or more user states based on any combination of locally sourced data (e.g., data generated by one or more sensors 154 included in computing device 102) and/or remotely sourced data (e.g., data received by computing device 102 from one or more external devices, such as one or more servers). For instance, user state module 114 may determine one or more activities engaged in by the user (e.g., walking, running, cycling, driving, playing a sport, exercising, and being present aboard a moving apparatus such as a boat, a car, a bus, a train, an aircraft, etc.), and/or one or more hand-eye coordination impairment states affecting the user (e.g., ambient temperature, an intoxication state of the user, attire worn by the user, etc.). User state module 114 may output an indication of the one or more detected user states to one or more other components of computing device 102, such as keyboard module 108. As further described herein, user state module 114 and keyboard module 108 may determine, based at least in part on the detected one or more user states, a particular candidate string for display, in some examples.

In operation, presence-sensitive display 104 may receive an indication of an input that is proximate to one or more of the plurality of keys of graphical keyboard 124. For instance, a user may perform one or more taps and/or continuous gestures at presence-sensitive display 104. Gesture module 110 may process data from presence-sensitive display 104 to determine one or more locations on the surface of presence-sensitive display 104. Based on the locations, gesture module 110 can determine input information that indicates a shape of the gesture path, locations of presence-sensitive display 104 traversed by the one or more swipe gestures, sequences of tap gestures, an expanding or contracting two-finger pinch gesture, etc. Gesture module 110 may output an indication of the input information to keyboard module 108.

User state module 114 may receive signals from one or more sensors 154 and, using that sensor information, select one or more user states associated with gesture accuracy. For instance, user state module 114 may determine that the user of computing device 102 is standing still (as illustrated by user state 103A), that the user of computing device 102 is standing still and wearing gloves (as illustrated by user state 103B), that the user of computing device 102 is walking (as illustrated by user state 103C), that the user of computing device 102 is cycling (as illustrated by user state 103D), etc. In some examples, user state module 114 may detect the one or more user states prior to, during, and/or after the user performs the gestures at presence-sensitive display 104. As one example, user state module 114 may periodically receive sensor inputs and reassess the one or more user states. As another example, user state module 114 may detect the one or more user states responsive to determining that the user is performing/has performed the gestures at presence-sensitive display 104. In any case, user state module 114 may output an indication of the one or more detected user states to keyboard module 108.

Keyboard module 108 may determine one or more candidate strings based at least on the one or more user states detected by user state module 114 and the input information determined by gesture module 110. For instance, where the one or more detected user states are associated with reduced gesture accuracy, keyboard module 108 may determine the one or more candidate strings with a reduced reliance on the accuracy of the input information. As one example, keyboard module 108 may adjust one or more parameters, such as one or more motor-noise parameters, used to determine a physical cost value for each candidate string of the one or more candidate strings. As another example, keyboard module 108 may reduce reliance on the accuracy of the input information when determining the one or more candidate strings by adjusting a relative weighting between physical cost values and lexical cost values for each of the one or more candidate strings. Further details of the physical cost values and the lexical cost values are discussed below with reference to FIG. 2.

In the example of FIG. 1, the user may perform one or more gestures that may be detected by presence-sensitive display 104. For instance, the user may perform a plurality of tap gestures intending to enter the phrase "Let's go" 120. Gesture module 110 may receive an indication of the gestures and determine that alignment points 129A-129F (collectively, "alignment points 129") are traversed by the gestures. User state module 114 may receive sensor input and select one or more user states associated with gesture accuracy. For example, user state module 114 may detect that the user is walking (i.e., user state 103C) which may reduce gesture accuracy relative to sitting or standing still. For instance, as the user walks, the relative movements of the user's body, computing device 102, and fingers may result in touch inputs at locations that correspond less accurately to the locations intended by the user. Based on the detected user state 103C from user state module 114 and alignment points 129A-129F from gesture module 110, keyboard module 108 may determine one or more candidate strings. For instance, as opposed to determining candidate string "Lrtd ho" without accounting for the user state, keyboard module 108 may determine candidate string "Let's go" 120 by reducing reliance on the accuracy of the alignment points 129 or increasing reliance of lexical models. In this way, techniques of this disclosure may improve the selection of candidate strings from touch data based at least in part on one or more detected user states.

FIG. 2 is a block diagram illustrating further details of one example of a computing device shown in FIG. 1, in accordance with one or more aspects of the present disclosure. FIG. 2 illustrates only one particular example of computing device 202, and many other examples of computing device 202 may be used in other instances.

As shown in the specific example of FIG. 2, computing device 202 includes one or more processors 240, one or more input components 242, one or more communication units 244, one or more output components 246, one or more storage devices 248, and presence-sensitive display 204. Computing device 202, in the example of FIG. 2 includes keyboard module 208, gesture module 210, operating system 257, user state module 214, spatial models 251, and language model 252. Each of components 240, 242, 244, 246, 248, and 204 may be interconnected (physically, communicatively, and/or operatively) for inter-component communications. In some examples, communication channels 250 may include a system bus, network connection, interprocess communication data structure, or any other channel for communicating data. As one example in FIG. 2, components 240, 242, 244, 246, 248, and 204 may be coupled by one or more communication channels 250. Keyboard module 208, gesture module 210, application modules 212A-

212N (collectively, "application modules 212"), operating system 257, user state module 214, spatial models 251, and language model 252 may also communicate information with one another as well as with other components in computing device 202.

Processors 240, in one example, are configured to implement functionality and/or process instructions for execution within computing device 202. For example, processors 240 may be capable of processing instructions stored in storage device 248. Examples of processors 240 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 248 may be configured to store information within computing device 202 during operation. Storage device 248, in some examples, is described as a computer-readable storage medium. In some examples, storage device 248 is a temporary memory, meaning that a primary purpose of storage device 248 is not long-term storage. Storage device 248, in some examples, is described as a volatile memory, meaning that storage device 248 does not maintain stored contents when the computing device is turned off. Examples of volatile memories include random access memories (RAM), dynamic random access memories (DRAM), static random access memories (SRAM), and other forms of volatile memories known in the art. In some examples, storage device 248 is used to store program instructions for execution by processors 240. Storage device 248, in one example, is used by software or applications running on computing device 202 (e.g., application modules 212) to temporarily store information during program execution.

Storage devices 248, in some examples, also include one or more computer-readable storage media. Storage devices 248 may be configured to store larger amounts of information than volatile memory. Storage devices 248 may further be configured for long-term storage of information. In some examples, storage devices 248 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 202, in some examples, also includes one or more communication units 244. Computing device 202, in one example, utilizes communication unit 244 to communicate with external devices via one or more networks, such as one or more wired or wireless networks. Communication unit 244 may be a network interface card, such as an Ethernet card, an optical transceiver, a radio frequency transceiver, or any other type of device that can send and receive information. Examples of such network interfaces may include Bluetooth, infrared signaling, 3G, LTE, and Wi-Fi radios as well as Universal Serial Bus (USB) and Ethernet. In some examples, computing device 202 utilizes communication unit 244 to wirelessly communicate with another computing device that is operably coupled to computing device 202.

One or more input components 242 of computing device 202 may receive input. Examples of input are tactile, audio, and video input. Input components 242 of computing device 202, in one example, includes a presence-sensitive display, touch-sensitive screen, mouse, keyboard, joystick, physical button/switch, voice responsive system, camera, microphone or any other type of device for detecting input from a human or machine.

As illustrated in FIG. 2, in some examples, input components 242 may include one or more sensors 254. One or more of sensors 254 may measure one more measurands. Examples of one or more of sensors 254 may include one or more location sensors (e.g., a global positioning system (GPS) sensor, an indoor positioning sensor, or the like), one or more motion/orientation sensors (e.g., an accelerometer, a gyroscope, or the like), a light sensor, a temperature sensor, a pressure (or grip) sensor, a physical switch, a proximity sensor, and one or more bio-sensors that can measure properties of the skin/blood, such as alcohol, blood sugar etc.

One or more output components 246 of computing device 202 may generate output. Examples of output are tactile, audio, and video output. Output components 246 of computing device 202, in one example, includes a presence-sensitive display, sound card, video graphics adapter card, speaker, electronic display, or any other type of device for generating output to a human or machine. The electronic display may be an LCD or OLED part of a touch screen, may be a non-touchscreen direct view display component such as a CRT, LED, LCD, or OLED. The display component may also be a projector instead of a direct view display.

Presence-sensitive display 204 of computing device 202 includes display component 256 and presence-sensitive input component 258. Display component 256 may be a screen at which information is displayed by presence-sensitive display 204 and presence-sensitive input component 258 may detect an object at and/or near display component 256. As one example range, a presence-sensitive input component 258 may detect an object, such as a finger or stylus that is within 2 inches (~5.08 centimeters) or less from display component 256. Presence-sensitive input component 258 may determine a location (e.g., an (x,y) coordinate) of display component 256 at which the object was detected. In another example range, presence-sensitive input component 258 may detect an object 6 inches (~15.24 centimeters) or less from display component 256 and other exemplary ranges are also possible. Presence-sensitive input component 258 may determine the location of display component 256 selected by a user's finger using capacitive, inductive, and/or optical recognition techniques. In some examples, presence sensitive input component 258 also provides output to a user using tactile, audio, or video stimuli as described with respect to display component 256. In the example of FIG. 2, presence-sensitive display 204 presents a user interface (such as user interface 116 of FIG. 1).

While illustrated as an internal component of computing device 202, presence-sensitive display 204 may also represent and external component that shares a data path with computing device 202 for transmitting and/or receiving input and output. For instance, in one example, presence-sensitive display 204 represents a built-in component of computing device 202 located within and physically connected to the external packaging of computing device 202 (e.g., a screen on a mobile phone). In another example, presence-sensitive display 204 represents an external component of computing device 202 located outside and physically separated from the packaging of computing device 202 (e.g., a monitor, a projector, etc. that shares a wired and/or wireless data path with a tablet computer).

Computing device 202 may include operating system 257. Operating system 257, in some examples, controls the operation of components of computing device 202. For example, operating system 257, in one example, facilitates the communication of UI module 206, keyboard module 208, gesture module 210, application modules 212, user state module 214, spatial models 251, and language model 252 with processors 240, communication unit 244, storage device 248, input components 242, output components 246, and presence-sensitive display 204. One or more components of storage devices 248 including UI module 206, keyboard module 208, gesture module 210, application modules 212, operating system 257, user state module 214, spatial models 251, and language models 252 may each include program instructions and/or data that are executable by computing device 202. As one example, UI module 206 may include instructions that cause computing device 202 to perform one or more of the operations and actions described in the present disclosure. In some examples, one or more of the components illustrated in storage device 248 may be implemented in hardware and/or a combination of software and hardware.

As discussed above, user state module 214 may detect one or more user states that may affect gesture accuracy. In some examples, user state module 214 may detect the one or more user states based on data received from one or more of sensors 254 and/or data received from one or more external devices (e.g., data received via one or more of communication units 244). For instance, user state module 214 may determine one or more activities engaged in by the user of computing device 202 based on data measured by one or more motion sensors and/or one or more location sensors of sensors 254. As one example, user state module 214 may determine that the user of computing device 202 is walking based on data measured by an accelerometer of sensors 54. As another example, user state module 214 may determine that the user of computing device 202 is in a boat based on a location sensor (e.g., a GPS sensor) of sensors 254 (e.g., if the position of computing device 202 corresponds to the location of a body of water). As another example, user state module 214 may determine that the user of computing device 202 is in a vehicle based on data received from one or more of communication units 244 (e.g., data indicating that computing device 202 is paired with a car, such as via Bluetooth).

Similarly, user state module 214 may determine one or more hand-eye coordination impairment states affecting the user of computing device 202 based on data measured by one or more climate sensors and/or one or more position, location, or movement sensors of sensors 254. As one example, user state module 14 may determine a temperature condition affecting the user of computing device 202 (e.g., that the user of computing device 202 is cold and may be shivering) based on a temperature sensor of sensors 254. As another example, user state module 214 may determine a temperature condition affecting the user of computing device 202 based on a location sensor of sensors 254 and weather data received via communication units 244 (e.g., that the location of computing device 202 is outdoors during cold weather).

As another example, user state module 214 may determine an impaired hand-eye coordination state of the user of computing device 202. For example, the user may be intoxicated. In one situation, a motion sensor of sensors 254 (e.g., a gyroscope or an accelerometer) may register unsteady or wavering gross motor movements of computing device 202 and a location sensor of sensors 254, as implemented using a GPS receiver, may register that a location of computing device 202 corresponds to the location of an alcohol serving establishment. User state module 214 may receive both of these sensor signals and select an impaired hand-eye coordination state for the user due to an inference of intoxication. In a different situation, user state module 214 may select an impaired hand-eye coordination state when a camera indicates that a user who usually wears eyeglasses is not currently wearing spectacles. In a different situation, user state module 214 may determine attire worn by the user of computing device 202 (e.g., that the user of computing device 202 is wearing gloves) based on touch data detected by an input component of input components 242 (e.g., larger sized touch events may indicate that the user of computing device 202 is wearing gloves).

In some example, user state module 214 may determine, for each respective user state, a value that indicates a degree, in a range of degrees, to which the respective user state, or combination of user states, affects gesture accuracy. As one example, user state module 214 may determine a value for running and a value for walking such that the value for running indicates that running affects gesture accuracy to a higher degree than walking. As another example, user state module 214 may determine a value for a combined intoxicated and walking state and a value for a combined intoxicated and sitting state such that the value for intoxicated and walking indicates that intoxicated and walking affects gesture accuracy to a higher degree than intoxicated and sitting. As another example, user state module 214 may determine a value for a combined intoxicated and wearing gloves state and a value for a combined intoxicated and bare hands state such that the value for intoxicated and wearing gloves indicates that intoxicated and wearing gloves affects gesture accuracy to a higher degree than intoxicated and bare hands. In some examples, user state module 214 may maintain data, such as a look up table, which maps a set of different user states to the different values. As one example, a look up table maintained by user state module 214 may indicate that the value for running is 3, the value for walking is 5, the value for riding in a vehicle is 3, etc.

In some examples, user state module 214 may update the values over time. In some examples, user state module 214 may update the values based on data for the user of computing device 202. For instance, at a first time user state module 214 may determine that the value for walking is 3 and the value for running is 6. Over time, user state module 214 may determine that the user of computing device 202 is able to accurately perform gestures while walking (e.g., based on indications from keyboard module 208 and gesture module 210 that touch points from the user are centered upon letters and/or that backspaces or other corrections are infrequent). As such, at a second time, user state module 214 may adjust the value for walking, e.g., to reduce the effect the walking state has on character strings determined while the user of computing device 202 is walking. In some examples, user state module 214 may update the values based on data for other users of computing device 202 or other computing devices (e.g., population based data).

Computing device 202, in some examples, includes language model 252. Language model 252 may include a lexicon. In some examples, a lexicon may include a listing of words and may include additional information about the listed words. A lexicon may be represented by a range of data structures, such as an array, a list, and/or a tree. For example, language model 252 may include a lexicon stored in a trie data structure. A lexicon trie data structure may contain a plurality of nodes, each node may represent a letter. The first node in a lexicon trie may be called the entry node which may not correspond to a letter. In other examples, the entry node may correspond to a letter. Each node may have one or more child nodes. For instance, the entry node may have twenty-six child nodes, each corresponding to a letter of the English alphabet.

A subset of the nodes in a lexicon trie may each include a flag which indicates that the node is a terminal node. Each terminal node of a lexicon trie may indicate a complete word (e.g., a candidate word). The letters indicated by the nodes along a path of nodes from the entry node to a terminal node may spell out a word indicated by the terminal node. In some examples, language model 252 may be a default dictionary installed on computing device 202. In other examples, language model 252 may include multiple sources of lexicons, which may be stored at computing device 202 or stored at one or more remote computing devices and are accessible to computing device 202 via one or more communication channels.

In some examples, language model 252 may be implemented in the firmware of computing device 202. Language model 252 may include language model frequency information such as n-gram language models. An n-gram language model may provide a probability distribution for an item $x_i$ (letter or word) in a contiguous sequence of items based on the previous items in the sequence (i.e., $P(x_i|x_{i-(n-1)}, \ldots, x_{i-1})$). For instance, a bigram language model (an n-gram model where n=2), may provide a probability that the letter "X" follows the sequence "FOX". In some examples, language model 252 includes a lexicon trie with integrated language model frequency information. For instance, each node of the lexicon trie may include a representation of a letter and a probability value.

Keyboard module 208, in some examples, may further use language model 252 to determine the probability that a given key was selected by user. For instance, when determining the probability of a key being selected by a user, keyboard module 208 may determine whether the character of the key corresponds to a word in language model 252 or a phrase generated based on words included in language model 252 and a context of previously or successively entered characters. For instance, keyboard module 208 may determine that, given the letters "FO" already typed and an input proximate to "X" and Z" at graphical keyboard 124, "FOX" and is more probable than "FOZ" and therefore assigns a higher probability to the letter "X" than the letter "Z."

In some examples, keyboard module 208 may incrementally determine one or more characters, words, phrases that are indicated by tap and/or continuous gesture. In one example, a user may desire to enter text, for example the word "friend" into a text entry area of the GUI. The user, in accordance with the techniques of this disclosure may perform a series of tap gestures at a graphical keyboard that is output for display by computing device 202. The gesture may include a plurality of distinct taps. In some examples, the tap gestures may be divided into portions with substantially equivalent time durations, while in other examples the tap gestures may be of different durations.

Keyboard module 208 may receive data from gesture module 210 that represents locations of display component 256 where display component 256 presents each of the keys of the graphical keyboard. Keyboard module 208 may determine, based on the locations of the keys, that the sequence of touch events represents a selection of one or more keys. Keyboard module 208 may determine one or more character strings based on the touch events where each character in the character string corresponds to a key of the graphical keyboard, in accordance with techniques of this disclosure. Keyboard module 8 may send data indicating one or more character strings to presence-sensitive display 204 to display on display component 256.

To determine a selection of one or more keys from the sequence of touch events, keyboard module 208 may use one or more spatial models 251. In general, spatial models 251 may indicate one or more probabilities that a particular key of a graphical keyboard has been selected based on location data associated with a user input. In some examples, spatial models 251 include a bivariate Gaussian model for each key. The bivariate Gaussian model for a key may include a distribution of coordinates (e.g., (x,y) coordinate pairs) that correspond to locations of display component 256 that present the given key. More specifically, in some examples, a bivariate Gaussian model for a key may include a distribution of coordinates that correspond to locations of display component 256 that are most frequently selected by a user when the user intends to select the given key. The shorter the distance between location data of a user input and a higher density area of one of spatial models 251, the higher the probability that the key associated with spatial model 251 has been selected. A greater distance between location data of a user input and a higher density area of one of spatial models 251, the lower the probability that the key associated with the one of spatial models 251 has been selected.

Keyboard module 208 may use spatial models 50 to compare the location components (e.g., coordinates) of one or more touch events in the sequence of touch events to respective locations of one or more keys of a graphical keyboard and generate a probability based on these comparisons that a selection of a key occurred. In some examples, keyboard module 208 may generate a spatial model score (or "spatial model probability") using one or more of spatial models 251. The spatial model score may indicate a probability of a selected key based at least in part on locations of display component 256 traversed by a gesture. In some examples, a spatial model score may indicate a combined probability of a group of selected keys based at least in part on locations of display component 256 traversed by a gesture.

Keyboard module 208 may use one or more of spatial models 251 to compare the location component of one or more touch event in the sequence of touch events to a key location of a particular key of a graphical keyboard. The location component of each touch event in the sequence may include one location of presence-sensitive display 204. A key location (e.g., a centroid of a key) of a key in a graphical keyboard may include a different location of presence-sensitive display 204. Keyboard module 208 may use one or more of spatial models 251 to determine a Euclidian distance between the two locations and generate a probability based on the Euclidian distance that the key was selected. Spatial models 251 may indicate a higher probability for a key that shares a smaller Euclidian distance with one or more touch events than a key that shares a greater Euclidian distance with one or more touch events. Based on the spatial model probability associated with each key, keyboard module 208 may assemble the individual key selections with the highest spatial model probabilities into a time-ordered sequence of keys that keyboard module 208 may then determine represents a character string. The combined probabilities of each key may represent a spatial model score for the character string. In some examples, the spatial model score for a character string may be referred to as a physical cost value for the character string.

Keyboard module 208 may use a language model 252 to determine language model scores (or "language model probabilities") for one or more characters strings based on the sequence of keys corresponding to touch events. For example, each key of the keyboard may represent a character or a keyboard operation. Keyboard module 208 may determine, based on the sequence of keys, particular characters represented by one or more key selections. A character such as a number or a lowercase letter may require a single character key selection (e.g., <letter-key>, <number-key>, etc.) and a character such as a capitalized letter may require two key selections (e.g., <shift-key>+<letter-key>, etc.).

Keyboard module 8 may access language model 252 of computing device 202 to determine language model scores for a group of one or more character strings based on sequences of keys corresponding to a gesture. That is, keyboard module 208 may incrementally generate a group of one or more character strings using language model 252 in response to receiving indications of one or more gestures. In some examples, the language model score for a character string may be referred to as a lexical cost value for the character string. A character string may be a group of characters comprising a prefix or portion of a character string included in language model 252 or an out-of-vocabulary (OOV) character string not included in language model 252. In some examples, a character string may be a group of characters comprising a complete character string included in language model 252 or a complete OOV character string.

As the user provides user input corresponding to one or more gestures, keyboard module 208 may incrementally determine spatial and language model scores (e.g., physical cost values and lexical cost values) corresponding to character strings. Using the spatial and language model scores, keyboard module 208 may determine a combined score for each character string based on the spatial and language model score for each respective character string. Keyboard module 208 may update the spatial, language, and/or combined scores incrementally as keyboard module 208 determines subsequent indications of gestures. For instance, keyboard module 208 may, while receiving a plurality of indications of one or more gestures detected at a presence-sensitive screen, update a language model score based on a language context, wherein the language context changes in response to at least one the plurality of indications of one or more gestures. For instance, the language model scores associated with character strings in language model 252 may change in response to character strings that are inputted. Because the combined score may indicate a probability that a character string corresponds to a gesture, keyboard module 208 may rank the character strings by their respective combined scores as further described in this disclosure. Keyboard module 8 may then output the character strings and/or determine other character strings based on the character strings for output.

Generally, language model 252 of computing device 202 may include a list of character strings, e.g., words, within a written language vocabulary. In some examples, language model 252 may be based on and/or include a set of character strings based on a dictionary (e.g., that includes a vocabulary of words) stored at computing device 202 or a remote computing device that is accessible by computing device 202. In some examples, the dictionary may include a vocabulary of words. A vocabulary of words may be a body of words used in a written and/or spoken language. A dictionary may be implemented as a data structure that stores one or more words of a vocabulary in a structured manner. Language model 252 may indicate a probability of each respective character string based on the frequency with which the character string occurs in a given language context. For instance, the character string "door" may be more frequently used in the English language following the character string "the" and therefore associated with a larger probability than, for example, the character string "run" following the character string "the."

In some examples, keyboard module 208 may use language model 252 to determine a language model score for a character string based on a language context that may include, but is not limited to, e.g., a character corresponding to indication of the gesture performed by the user, character strings in a dictionary and/or previously inputted character strings, etc. For example, keyboard module 208 may determine a group of characters associated with keys corresponding to a gesture. The group of characters may be a prefix or portion of a character string. The character string may be included in language model 252 or may be an out-of-vocabulary character string. Keyboard module 208 may search or "look ahead" to determine one or more character strings in language model 252 that correspond respectively to the prefix.

In some examples, keyboard module 208 may perform a lookup of multiple different groups of characters associated with keys corresponding to a gesture, for example, where each group of characters may be a prefix or portion of a character string. Keyboard module 208 may use language model 252 to identify one or more character strings in language model 252 that include a part of or all of the characters of the group of characters that may be a prefix or portion of the character string. For instance, a user may perform a gesture at display component 256 that traverses the keys s-a-r-t. Keyboard module 208 may therefore perform a lookup of prefix s-a-r to determine a group of character strings that begin with s-a-r. Similarly, keyboard module 208 may perform a lookup of prefix s-a-t to determine a group of character strings that begin with s-a-t.

As described above, keyboard module 208 may determine a combined score for each character string based at least in part on the respective spatial and language model scores for each respective character string. The combined probability for a character string may therefore represent the probability of the character string based on a language context and the accuracy of a gesture given a set of keys. Keyboard module 208 may order each character string in a group of character strings by combined score in descending order from most probable character string to least probable character string. In some examples, keyboard module 208 may determine one or more character strings based on the one or more character string with the highest probabilities. display component 256 may output such character strings as suggested character strings.

In accordance with one or more techniques of this disclosure, keyboard module 208 may determine the one or more candidate strings based at least on the one or more user states detected by user state module 214. For instance, when determining a combined score for a character string, keyboard module 208 may adjust, based at least in part one the one or more user states detected by user state module 214, at least one of a spatial model score for the character string or a language model score for the character string. As one example, when user state module 214 detects a state of the user of computing device 202 may reduce gesture accuracy, keyboard module 208 may determine the combined score such that the spatial model score is not weighted as much as the language model score. In some examples, keyboard module 208 may adjust the weighting based on a value received from user state module 214 that indicates a degree, in a range of degrees, to which the detected user state affects gesture accuracy. In this way, as opposed to adjusting the weighting in the same manner for all user states, keyboard module 208 may adjust the weighting based on the particular detected user state(s).

In some examples, in addition to or as opposed to adjusting the weighting of the spatial model scores and the language model scores, keyboard module 208 may adjust the determination of the spatial model scores based at least on the one or more user states detected by user state module 214. For instance, keyboard module 208 may modify the spatial model of spatial models 251 used to determine the spatial model scores based at least on the one or more user states detected by user state module 214. For example, where spatial models 251 include a bivariate Gaussian model for each key, keyboard module 208 may modify the bivariate Gaussian model based on the value received from user state module 214 that indicates the degree to which the detected user state affects gesture accuracy. Further details of how keyboard module 208 may modify spatial models are discussed below with reference to FIG. 3.

In any case, keyboard module 208 may select, based at least in part on the adjusting, a particular candidate string from the one or more candidate strings. For instance, as discussed above, keyboard module 208 may rank the character strings by their respective combined scores, and select the candidate string with the best rank (i.e., most probable) as the particular candidate string. Keyboard module 208 may output the particular candidate string, such as for display at display component 256. In this way, keyboard module 208 may compensate for one or more detected user states when selecting candidate strings.

Figure 3:
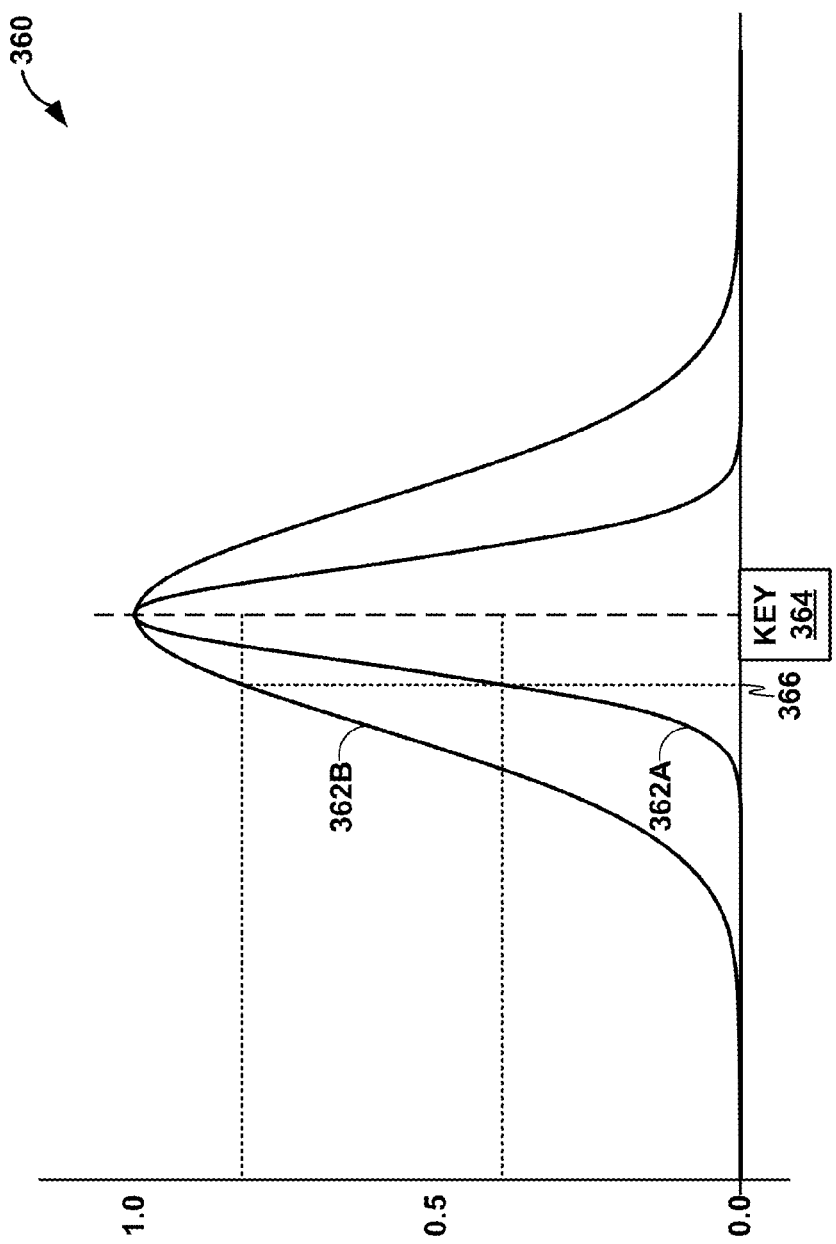
FIG. 3 is a graph illustrating example spatial models for a particular key, in accordance with one or more techniques of the present disclosure.

FIG. 3 is a graph illustrating spatial models for a particular key, in accordance with one or more techniques of this disclosure. As illustrated in FIG. 3, graph 360 includes a horizontal axis representing locations along a surface of display component 256 of presence-sensitive display 204 of FIG. 2, a vertical axis representing the probability that a touch event corresponds to key 364, and curves for spatial models 362A and 362B (collectively, "spatial models 362"). In some examples, spatial models 362 may be examples of spatial models that may be included in spatial models 251 of FIG. 2. For instance, a keyboard module, such as keyboard module 108 of FIG. 1 or 208 of FIG. 2, may use one or more of spatial models 362 to generate a probability that key 364 was selected.

As discussed above and in accordance with one or more techniques of this disclosure, keyboard module 208 may modify a spatial model used to determine the spatial model scores based at least on the one or more user states detected by user state module 214. For instance, responsive to user state module 214 detecting a user state that reduces gesture accuracy, keyboard module 208 may modify spatial model 362A to generate spatial model 362B. Alternatively, as opposed to modifying spatial model 362A to generate spatial model 362B, keyboard module 208 may select spatial model 362B based at least on the one or more user states detected by user state module 214.

By modifying or selecting the spatial model used to determine the spatial model scores based at least on the one or more user states detected by user state module 214, keyboard module 208 may compensate for one or more detected user states when selecting candidate strings. For example, if the user of computing device 202 touches location 366, as detected by presence-sensitive input component 258 and determined by gesture module 210, while user state module 214 detects that the user is walking, as selected by the user state module 214, and the spatial model used to determine the spatial model scores is not modified or selected based at least on the detected user state (i.e., spatial model 362A is used without modification), keyboard module 208 may determine that a touch event at location 366 of display component 256 has less than a 50% probability of corresponding to key 364. By contrast, if the spatial model used to determine the spatial model scores is modified or selected based at least on the detected user state (i.e., spatial model 362B is used), keyboard module 208 may determine that a touch event at location 366 of display component 256 has greater than a 50% probability of corresponding to key 364.

Figure 4:
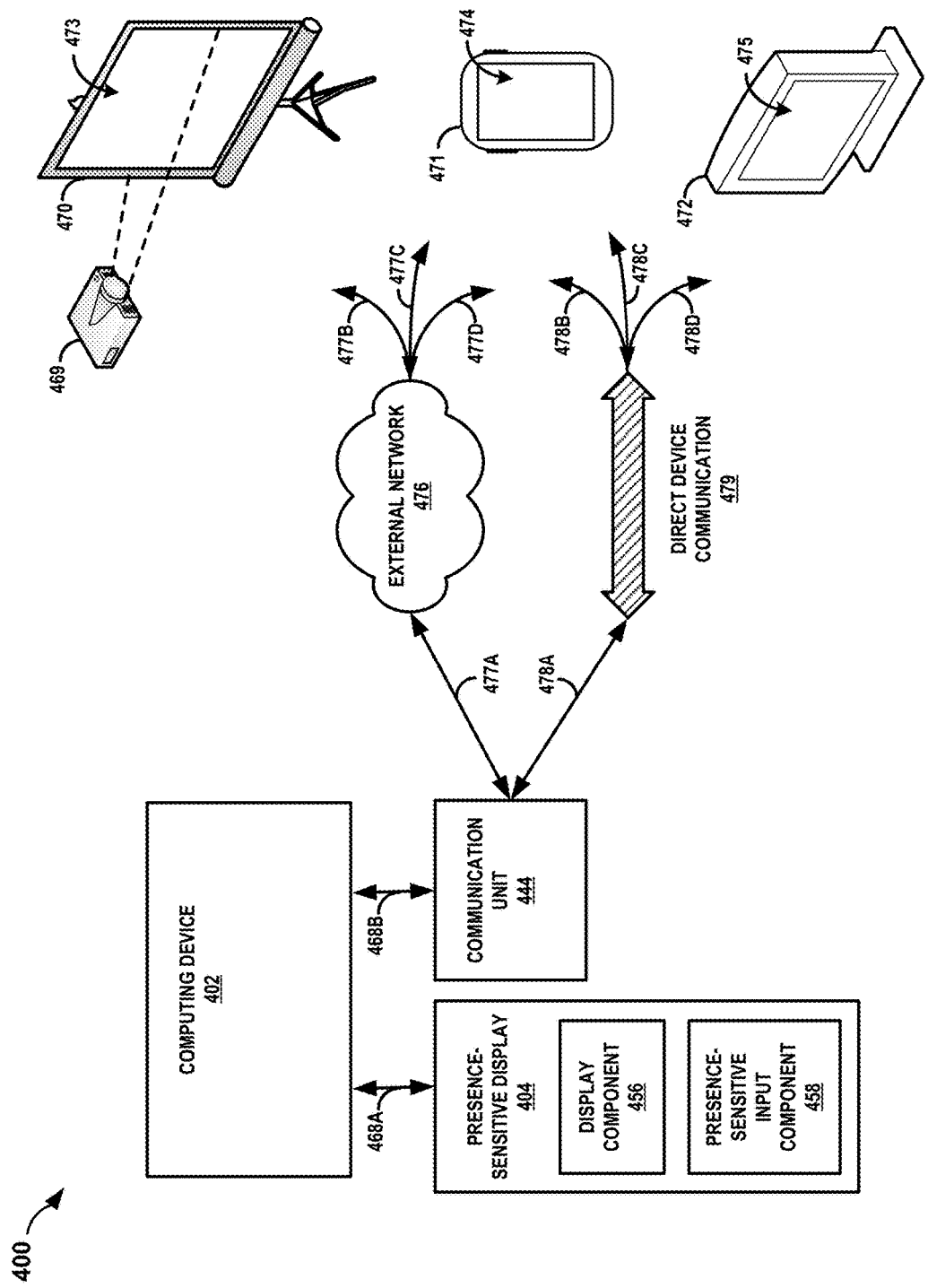
FIG. 4 is a block diagram illustrating an example computing device that outputs graphical content for display at a remote device, in accordance with one or more techniques of the present disclosure.

FIG. 4 is a block diagram 400 illustrating an example computing device that outputs graphical content for display at a remote device, in accordance with one or more techniques of the present disclosure. Graphical content, generally, may include any visual information that may be output for display, such as text, images, a group of moving images, etc. The example shown in FIG. 4 includes a computing device 402, presence-sensitive display 404, communication unit 444, projector 469, projector screen 470, mobile device 471, and visual display device 472. Although shown for purposes of example in FIGS. 1 and 2 as a stand-alone computing device 102 and 202, a computing device such as computing device 402 may, generally, be any component or system that includes a processor or other suitable computing environment for executing software instructions and, for example, need not include a presence-sensitive display.

As shown in the example of FIG. 4, computing device 402 may be a processor that includes functionality as described with respect to processor 240 in FIG. 2. In such examples, computing device 402 may be operatively coupled to presence-sensitive display 404 by a communication channel 468A, which may be a system bus or other suitable connection. Computing device 402 may also be operatively coupled to communication unit 444, further described below, by a communication channel 468B, which may also be a system bus or other suitable connection. Although shown separately as an example in FIG. 4, computing device 402 may be operatively coupled to presence-sensitive display 404 and communication unit 444 by any number of one or more communication channels.

In other examples, such as illustrated previously by computing device 102 in FIG. 1 and computing device 202 in FIG. 2, a computing device may refer to a portable or mobile device such as a mobile phone (including smart phone), laptop computer, smartwatch, etc. In some examples, a computing device may be a desktop computer, tablet computer, smart television platform, gaming console, remote controller, electronic camera, personal digital assistant (PDA), server, mainframe, etc.

Presence-sensitive display 404, like presence-sensitive display 204 as shown in FIG. 2, may include display component 456 and presence-sensitive input component 458. Display component 456 may, for example, receive data from computing device 402 and display the graphical content. In some examples, presence-sensitive input component 458 may determine one or more user inputs (e.g., continuous gestures, multi-touch gestures, single-touch gestures, etc.) at presence-sensitive display 404 using capacitive, inductive, and/or optical recognition techniques and send indications of such user input to computing device 402 using communication channel 468A. In some examples, presence-sensitive input component 458 may be physically positioned on top of display component 456 such that, when a user positions an input unit over a graphical element displayed by display component 456, the location at which presence-sensitive input component 458 corresponds to the location of display component 456 at which the graphical element is displayed. In other examples, presence-sensitive input component 458 may be positioned physically apart from display component 456, and locations of presence-sensitive input component 458 may correspond to locations of display component 456, such that input can be made at presence-sensitive input component 458 for interacting with graphical elements displayed at corresponding locations of display component 456.

As shown in FIG. 4, computing device 402 may also include and/or be operatively coupled with communication unit 444. Communication unit 444 may include functionality of communication unit 244 as described in FIG. 2. Examples of communication unit 444 may include a network interface card, an Ethernet card, an optical transceiver, a radio frequency transceiver, or any other type of device that can send and receive information. Other examples of such communication units may include Bluetooth, 3G, and Wi-Fi radios, Universal Serial Bus (USB) interfaces, etc. Computing device 402 may also include and/or be operatively coupled with one or more other devices, e.g., input devices, output devices, memory, storage devices, etc. that are not shown in FIG. 4 for purposes of brevity and illustration.

FIG. 4 also illustrates a projector 469 and projector screen 470. Other such examples of projection devices may include electronic whiteboards, holographic display devices, and any other suitable devices for displaying graphical content. Projector 469 and projector screen 470 may include one or more communication units that enable the respective devices to communicate with computing device 402. In some examples, the one or more communication units may enable communication between projector 469 and projector screen 470. Projector 469 may receive data from computing device 402 that includes graphical content. Projector 469, in response to receiving the data, may project the graphical content onto projector screen 470. In some examples, projector 469 may determine one or more user inputs (e.g., continuous gestures, multi-touch gestures, single-touch gestures, etc.) at projector screen using optical recognition or other suitable techniques and send indications of such user input using one or more communication units to computing device 402. In such examples, projector screen 470 may be unnecessary, and projector 469 may project graphical content on any suitable medium and detect one or more user inputs using optical recognition or other such suitable techniques.

Projector screen 470, in some examples, may include a presence-sensitive display 473. Presence-sensitive display 473 may include a subset of functionality or all of the functionality of presence-sensitive display 404 as described in this disclosure. In some examples, presence-sensitive display 473 may include additional functionality. Projector screen 470 (e.g., an electronic whiteboard), may receive data from computing device 402 and display the graphical content. In some examples, presence-sensitive display 473 may determine one or more user inputs (e.g., continuous gestures, multi-touch gestures, single-touch gestures, etc.) at projector screen 470 using capacitive, inductive, and/or optical recognition techniques and send indications of such user input using one or more communication units to computing device 402.

FIG. 4 also illustrates mobile device 471 and visual display device 472. Mobile device 471 and visual display device 472 may each include computing and connectivity capabilities. Examples of mobile device 471 may include e-reader devices, convertible notebook devices, hybrid slate devices, etc. Examples of visual display device 472 may include other semi-stationary devices such as televisions, computer monitors, etc. As shown in FIG. 4, mobile device 471 may include a presence-sensitive display 474. Visual display device 472 may include a presence-sensitive display 475. Presence-sensitive displays 474, 475 may include a subset of functionality or all of the functionality of presence-sensitive display 404 as described in this disclosure. In some examples, presence-sensitive displays 474, 475 may include additional functionality. In any case, presence-sensitive display 475, for example, may receive data from computing device 402 and display the graphical content. In some examples, presence-sensitive display 475 may determine one or more user inputs (e.g., continuous gestures, multi-touch gestures, single-touch gestures, etc.) at projector screen using capacitive, inductive, and/or optical recognition techniques and send indications of such user input using one or more communication units to computing device 402.

As described above, in some examples, computing device 402 may output graphical content for display at presence-sensitive display 404 that is coupled to computing device 402 by a system bus or other suitable communication channel. Computing device 402 may also output graphical content for display at one or more remote devices, such as projector 469, projector screen 470, mobile device 471, and visual display device 472. For instance, computing device 402 may execute one or more instructions to generate and/or modify graphical content in accordance with techniques of the present disclosure. Computing device 402 may output the data that includes the graphical content to a communication unit of computing device 402, such as communication unit 444. Communication unit 444 may send the data to one or more of the remote devices, such as projector 469, projector screen 470, mobile device 471, and/or visual display device 472. In this way, computing device 402 may output the graphical content for display at one or more of the remote devices. In some examples, one or more of the remote devices may output the graphical content at a presence-sensitive display that is included in and/or operatively coupled to the respective remote devices.

In some examples, computing device 402 may not output graphical content at presence-sensitive display 404 that is operatively coupled to computing device 402. In other examples, computing device 402 may output graphical content for display at both a presence-sensitive display 404 that is coupled to computing device 402 by communication channel 468A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 402 and output for display at presence-sensitive display 404 may be different than graphical content display output for display at one or more remote devices.

Computing device 402 may send and receive data using any suitable communication techniques. For example, computing device 402 may be operatively coupled to external network 476 using network link 477A. Each of the remote devices illustrated in FIG. 4 may be operatively coupled to network external network 476 by one of respective network links 477B, 477C, and 477D. External network 476 may include network hubs, network switches, network routers, etc., that are operatively inter-coupled thereby providing for the exchange of information between computing device 402 and the remote devices illustrated in FIG. 4. In some examples, network links 477A-477D may be Ethernet, ATM or other network connections. Such connections may be wireless and/or wired connections.

In some examples, computing device 402 may be operatively coupled to one or more of the remote devices included in FIG. 4 using direct device communication 479. Direct device communication 479 may include communications through which computing device 402 sends and receives data directly with a remote device, using wired or wireless communication. That is, in some examples of direct device communication 479, data sent by computing device 402 may not be forwarded by one or more additional devices before being received at the remote device, and vice-versa. Examples of direct device communication 479 may include Bluetooth, Near-Field Communication, Universal Serial Bus, WiFi, infrared, etc. One or more of the remote devices illustrated in FIG. 4 may be operatively coupled with computing device 402 by communication links 478A-478D. In some examples, communication links 478A-478D may be connections using Bluetooth, Near-Field Communication, Universal Serial Bus, infrared, etc. Such connections may be wireless and/or wired connections.

In accordance with techniques of the disclosure, computing device 402 may be operatively coupled to mobile device 471 using external network 476. Computing device 402 may output for display at presence-sensitive display 475, a graphical keyboard comprising a plurality of keys. For instance, computing device 402 may send data that includes a representation of the graphical keyboard to communication unit 444. Communication unit 444 may send the data that includes the representation of the graphical keyboard to mobile device 471 using external network 476. Mobile device 471, in response to receiving the data using external network 476, may cause presence-sensitive display 474 to output the graphical keyboard. In response to a user providing an input at presence-sensitive display, mobile device 471 may send an indication of the input to computing device 402 using external network 476. Communication unit 444 of may receive the indication of the gesture, and send the indication to computing device 402.

As discussed above, computing device 402 may detect one or more user states that affect gesture accuracy. In response to receiving the gesture, computing device 402 may select, based at least in part on one or more detected user states, a particular candidate string. Computing device 402 may output for display, the particular a candidate string that is determined based at least in part on the one or more detected user states. For instance, computing device 402 may send data representing the candidate string to communication unit 444. Communication unit 444 may send the data to mobile device 471 via external network 476. Mobile device 471 may cause presence-sensitive display 474 to output the at least one string represented by the data.

Figure 5:
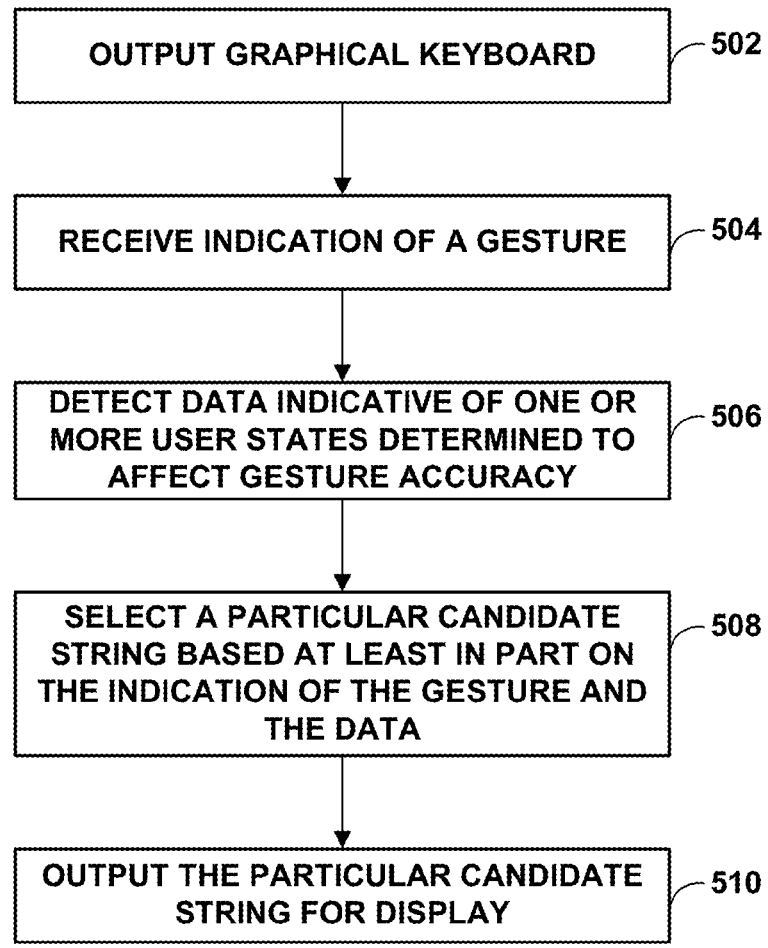
FIG. 5 is a flow diagram illustrating example operations of a computing device that selects candidate strings based on one or more detected user states, in accordance with one or more techniques of the present disclosure.

FIG. 5 is a flow diagram illustrating example operations of a computing device that selects candidate strings based on one or more detected user states, in accordance with one or more techniques of the present disclosure. The techniques of FIG. 5 may be performed by one or more processors of a computing device, such as computing device 102, 202 illustrated in FIG. 1 and FIG. 2. For purposes of illustration, the techniques of FIG. 5 are described within the context of computing device 202 of FIG. 2, although computing devices having configurations different than that of computing device 202 may perform the techniques of FIG. 5.

In accordance with one or more techniques of this disclosure, computing device 202 may output 502, for display at a display device that is operatively coupled to the computing device 202, a graphical keyboard comprising a plurality of keys. For instance, keyboard module 208 of computing device 202 may generate a graphical keyboard 124 for display at display component 256 of presence-sensitive display 204 of computing device 202. Computing device 202 may receive 504 an indication of a gesture detected at a presence-sensitive input device that is operatively coupled to the computing device. For instance, gesture module 210 may receive data indicating a gesture input by a user at presence-sensitive input component 258 of presence-sensitive display 204.

Computing device 202 may detect 506 data indicative of one or more user states that affect gesture accuracy. For instance, user state module 214 of computing device 202 may determine one or more activities engaged in by the user (e.g., walking, running, cycling, riding in a vehicle, riding in a boat, flying, etc.), and/or one or more hand-eye coordination impairment states affecting the user (e.g., ambient temperature, an intoxication state of the user, attire worn by the user, etc.). In some examples, user state module 214 may detect the one or more user states that affect gesture accuracy while the user performed the gesture detected at the presence-sensitive input device. In some examples, user state module 214 may detect the one or more user states that affect gesture accuracy prior to the user performing the gesture detected at the presence-sensitive input device.

Computing device 202 may select 508, based at least in part on the indication of the gesture and the data indicative of the one or more user states, a particular candidate string. For instance, where the one or more detected user states are associated with reduced gesture accuracy, keyboard module 208 may determine the one or more candidate strings with a reduced reliance on the accuracy of the input alignment points 129 information determined by gesture module 210. Computing device 202 may output 510, for display at the display device, the particular candidate string. For instance, keyboard module 208 may output the particular candidate string for display at display component 256. In this way, techniques of this disclosure may improve the selecting of candidate strings based at least in part on one or more detected user states.

Figure 6:
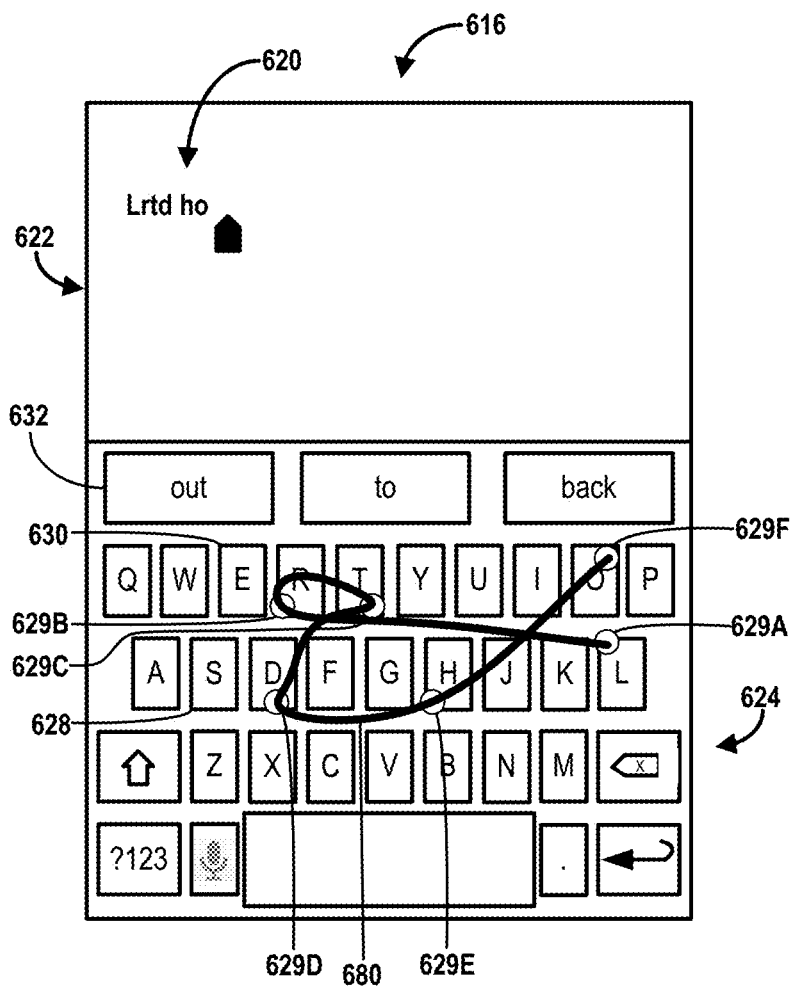
FIG. 6 is a conceptual diagram illustrating an example user interface that allows a user to interact with a computing device, in accordance with one or more techniques of the present disclosure.

FIG. 6 is a conceptual diagram illustrating an example user interface that allows a user to interact with a computing device, in accordance with one or more techniques of the present disclosure. As illustrated in FIG. 6, graphical user interface (GUI) 616 may be an example of GUI 116 of FIG. 1. For instance, GUI 616 may be a user interface generated by one or more of keyboard module 108 of FIG. 1 and application module 112A of FIG. 1 that allows a user to interact with a computing device, such as computing device 102 of FIG. 1.

As shown in FIG. 6, text editor control 622 may display text content entered by a user, generated by computing device 102, and/or received by computing device 102 from another computing device that is operably coupled to computing device 102. For purposes of illustration in FIG. 6, text content may include "Lrtd ho" 620. Keyboard module 108 may cause presence-sensitive display 104 to display text editor control 622 with the included text content.

Graphical keyboard 624 may be displayed by presence-sensitive display 104 as a set of selectable keys. Keys may represent a single character from a character set (e.g., letters of the English alphabet), or may represent combinations of characters. One example of a graphical keyboard may include a traditional "QWERTY" keyboard layout. Other examples may contain characters for different languages, different character sets, or different character layouts. As shown in the example of FIG. 6, graphical keyboard 124 includes a version of the traditional "QWERTY" keyboard layout for the English language providing character keys as well as various keys (e.g., the "up arrow" key that provide "shift" functionality) providing other functionality. Example keys include "E" key 630 and "S" key 628. In some examples, graphical keyboard 624 includes one or more word suggestions, such as word suggestion 632 that includes the word "out."

As discussed above and in accordance with techniques of the disclosure, computing device 102 may implement a user state module 114 to improve the accuracy of user selections at keyboard 124. User state module 114, as described in this disclosure, may select one or more user states associated with gesture accuracy, output an indication of the one or more detected user states to one or more other components of computing device 102, such as keyboard module 108. As also discussed above, user state module 114 and keyboard module 108 may determine, based at least in part on the detected one or more user states, a particular candidate string for display, in some examples.

The user may perform one or more gestures that may be detected by presence-sensitive display 104. For instance, the user may perform a swipe gesture intending to enter the phrase "Let's go" 120. As shown in the example of FIG. 6, the swipe gesture performed by the user to enter the phrase "Let's go" 120 may begin near to the "L" key, follow path 680, and end near the "O" key. Gesture module 110 may receive an indication of the gestures and determine that alignment points 629A-629F (collectively, "alignment points 629") are traversed by the gestures. User state module 114 may receive sensor input and select one or more user states associated with gesture accuracy. For example, in the example of FIG. 6, user state module 114 may detect that the user is sitting which may not reduce gesture accuracy relative to walking or running Based on the detected user state from user state module 114 and alignment points 629A-629F from gesture module 110, keyboard module 108 may determine one or more candidate strings. For instance, as opposed to the example of FIG. 1 where the detected user state reduces gesture accuracy and keyboard module 108 reduced reliance on the accuracy of alignment points 129 by using a spatial model more like 362B than 362A and/or increased reliance on lexical models, in the example of FIG. 6, keyboard module 108 may determine candidate string "Lrtd ho" without reducing reliance on the accuracy of the alignment points 629 or increasing reliance of lexical models. While, in the example of FIG. 6, the candidate string determined by keyboard module 108 may not be the string that the user desired to enter (i.e., "Let's go"), keyboard module 108 may not correct for the user's sloppy gesture entry when the detected user state does not affect gesture accuracy. In this way, techniques of this disclosure may improve the selection of candidate strings from touch data based at least in part on one or more detected user states.

The following numbered examples may illustrate one or more aspects of the present disclosure.

EXAMPLE 1

A method comprising: outputting, by a computing device and for display at a display device operatively coupled to the computing device, a graphical keyboard comprising a plurality of keys; receiving, by the computing device, an indication of a gesture detected at a presence-sensitive input device operatively coupled to the computing device; detecting, by the computing device, data indicative of one or more user states determined to affect gesture accuracy; selecting, by the computing device and based at least in part on the indication of the gesture and the data, a particular candidate string; and outputting, by the computing device and for display at the display device, the particular candidate string.

EXAMPLE 2

The method of example 1, wherein the data indicative of one or more user states indicates at least one of: one or more activities engaged in by a user of the computing device while the user performed the gesture, and one or more hand-eye coordination impairment states affecting the user while the user performed the gesture.

EXAMPLE 3

The method of any combination of examples 1-2, wherein the one or more activities engaged in by the user include one or more of walking, running, cycling, playing a sport, exercising, and being present aboard a moving apparatus.

EXAMPLE 4

The method of any combination of examples 1-3, wherein the one or more hand-eye coordination impairment states affecting the user include one or more of a user temperature condition, an intoxication state of the user, and attire worn by user.

EXAMPLE 5

The method of any combination of examples 1-4, wherein selecting the particular candidate string comprises: determining, based on the gesture, a plurality of candidate strings, wherein each of the plurality of character strings is associated with at least one of a respective physical cost value from a spatial model and a respective lexical cost value from a language model; adjusting, for a particular candidate character string of the plurality of character strings and based at least in part on the one or more user states, at least one of a physical cost value associated with the particular candidate character string and a lexical cost value associated with the particular candidate character string; and selecting, based at least in part on the adjusting, the particular candidate string from the plurality of candidate strings.

EXAMPLE 6

The method of any combination of examples 1-6, wherein adjusting at least one of the physical cost value associated with the particular candidate character string and the lexical cost value associated with the particular candidate character string further comprises: determining, based at least in part on at least one user state, a weight; and applying the weight to the at least one of the physical cost value associated with the particular candidate character string and the lexical cost value associated with the particular candidate character string.

EXAMPLE 7

The method of any combination of examples 1-6, further comprising: determining, for each respective user state of the one or more user states, a respective model that provides at least one value indicating a degree, in a range of degrees, to which the respective user state affects gesture accuracy, wherein adjusting at least one of the physical cost value associated with the particular candidate character string or the lexical cost value associated with the particular candidate character string further comprises adjusting the relative weight based on the respective models for each of the detected one or more user states.

EXAMPLE 8

The method of any combination of examples 1-7, wherein the gesture is a series of taps.

EXAMPLE 9

The method of any combination of examples 1-7, wherein the gesture is a swipe with two end points.

EXAMPLE 10

The method of any combination of examples 1-7, wherein the gesture further comprises angle-of-direction changes between the two endpoints.

EXAMPLE 11

The method of any combination of examples 1-10, wherein the graphical keyboard is a virtual keyboard.

EXAMPLE 12

A computing device comprising: one or more processors; one or more sensors, coupled to the one or more processors, configured to detect data indicative of one or more user states determined to affect gesture accuracy; a presence-sensitive display, coupled to the one or more processors, comprising a display component and a presence-sensitive input component; a storage device storing at least one module, wherein the at least one module is executable by the one or more processors to: output, for display at a display component, a graphical keyboard comprising a plurality of keys; receive an indication of a gesture detected at the presence-sensitive input component; select, based at least in part on the indication of the gesture and the data, a particular candidate string; and output, for display at the display device, the particular candidate string.

EXAMPLE 13

The computing device of example 12, wherein the one or more sensors configured to detect the data indicative of one or more user states comprise at least one of: one or more sensors configured to detect data indicative of one or more activities engaged in by a user of the computing device while the user performed the gesture; and one or more sensors configured to detect data indicative of one or more hand-eye coordination impairment states affecting the user while the user performed the gesture.

EXAMPLE 14

The computing device of any combination of examples 12-13, wherein one or more sensors configured to detect data indicative of one or more activities engaged in by the user of the computing device comprise a motion sensor for determining the one or more activities.

EXAMPLE 15

The computing device of any combination of examples 12-14, wherein the one or more sensors configured to detect data indicative of one or more hand-eye coordination impairment states affecting the user while the user performed the gesture comprise a thermometer for determining an ambient temperature.

EXAMPLE 16

The computing device of any combination of examples 12-15, wherein the storage device further stores a spatial model and a language model, and wherein, to select the particular candidate string, the at least one module is executable by the one or more processors to: determine, based on the gesture, a plurality of candidate strings, wherein each of the plurality of character strings is associated with at least one of a respective physical cost value from the spatial model and a respective lexical cost value from the language model; adjust, for a particular candidate character string of the plurality of character strings and based at least in part on the one or more user states, at least one of a physical cost value associated with the particular candidate character string and a lexical cost value associated with the particular candidate character string; and select, based at least in part on the adjusting, the particular candidate string from the plurality of candidate strings.

EXAMPLE 17

The computing device of any combination of examples 12-16, wherein, to adjust at least one of the physical cost value associated with the particular candidate character string and the lexical cost value associated with the particular candidate character string, the at least one module is further executable by the one or more processors to: determine, based at least in part on at least one user state, a weight; and apply the weight to the at least one of the physical cost value associated with the particular candidate character string and the lexical cost value associated with the particular candidate character string.

EXAMPLE 18

The computing device of any combination of examples 12-17, wherein the at least one module is further executable by the one or more processors to: determine, for each respective user state of the one or more user states, a respective model that provides at least one value indicating a degree, in a range of degrees, to which the respective user state affects gesture accuracy, wherein the at least one module is further executable by the one or more processors to adjust at least one of the physical cost value associated with the particular candidate character string or the lexical cost value associated with the particular candidate character string by at least adjusting the relative weight based on the respective models for each of the detected one or more user states.

EXAMPLE 19

A non-transitory computer-readable storage medium storing instructions that, when executed, cause one or more processors of a computing device to: output, for display at a display device that is operatively coupled to the computing device, a graphical keyboard comprising a plurality of keys; receive an indication of a gesture detected at a presence-sensitive input device that is operatively coupled to the computing device; detect data indicative of one or more user states determined to affect gesture accuracy; select, based at least in part on the indication of the gesture and the data, a particular candidate string; and output, for display at the display device, the particular candidate string.

EXAMPLE 20

The computer-readable storage medium of example 19, wherein the data indicative of one or more user states indicates at least one of one or more activities engaged in by a user of the computing device while the user performed the gesture, and one or more hand-eye coordination impairment states conditions affecting the user while the user performed the gesture, wherein the one or more activities engaged in by the user include one or more of walking, running, cycling, driving, playing a sport, exercising, and being present aboard a moving apparatus; and wherein the one or more hand-eye coordination impairment states affecting the user include one or more of a temperature condition, a physiological state, and attire worn by user.

EXAMPLE 21

The computer-readable storage medium of example 19, further storing instructions that cause the one or more processors to perform the method of any combination of examples 1-11.

EXAMPLE 22

A device comprising means for performing the method of any combination of examples 1-11.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. In some instances, the term "non-transitory" indicates that the storage medium is not embodied in a carrier wave or a propagated signal. In certain examples, a non-transitory storage medium may store data that can, over time, change (e.g., in RAM or cache).

It is to be recognized that depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processors, rather than sequentially.

Various embodiments have been described. These and other embodiments are within the scope of the following claims.

The invention claimed is:

1. A method comprising:
   outputting, by a computing device and for display at a display device operatively coupled to the computing device, a graphical keyboard comprising a plurality of keys;
   receiving, by the computing device, an indication of a gesture detected at a presence-sensitive input device operatively coupled to the computing device;
   detecting, by the computing device, data indicative of one or more user states determined to affect gesture accuracy;
   determining, for respective user states of the one or more user states, respective models that provide at least one value indicating a degree, in a range of degrees, to which the respective user state affects gesture accuracy;
   selecting, by the computing device and based at least in part on the indication of the gesture and the data indicative of the one or more user states, a particular candidate string, wherein selecting the particular candidate string comprises:
      determining, based on the gesture, a plurality of candidate character strings, wherein each of the plurality of candidate character strings is associated with at least one of a respective physical cost value from a spatial model and a respective lexical cost value from a language model;
      adjusting, for a particular candidate character string of the plurality of candidate character strings and based at least in part on the detected one or more user states, at least one of a physical cost value associated with the particular candidate character string and a lexical cost value associated with the particular candidate character string, wherein the adjusting comprises adjusting a relative weight based on the respective models for each of the one or more user states; and selecting, based at least in part on the adjusting, the particular candidate character string from the plurality of candidate character strings; and outputting, by the computing device and for display at the display device, the particular candidate string.

2. The method of claim 1, wherein the data indicative of the one or more user states further indicates:

one or more activities engaged in by a user of the computing device while the user performed the gesture, or one or more hand-eye coordination impairment states affecting the user while the user performed the gesture.

3. The method of claim 2, wherein the one or more activities engaged in by the user include one or more of walking, running, cycling, playing a sport, exercising, and being present aboard a moving apparatus.

4. The method of claim 1, wherein the one or more hand-eye coordination impairment states affecting the user further include a user temperature condition, an intoxication state of the user, or attire worn by the user.

5. The method of claim 1, wherein adjusting at least one of the physical cost value associated with the particular candidate character string and the lexical cost value associated with the particular candidate character string further comprises:

determining, based at least in part on at least one user state, a weight; and applying the weight to the at least one of the physical cost value associated with the particular candidate character string and the lexical cost value associated with the particular candidate character string.

6. The method of claim 1 wherein the gesture is a series of taps.

7. The method of claim 1, wherein the gesture is a swipe with two end points.

8. The method of claim 7, wherein the gesture further comprises angle-of-direction changes between the two endpoints.

9. The method of claim 1, wherein the graphical keyboard is a virtual keyboard.

10. A computing device comprising:

one or more processors;

one or more sensors, coupled to the one or more processors, configured to detect data indicative of one or more user states determined to affect gesture accuracy;

a presence-sensitive display, coupled to the one or more processors, comprising a display component and a presence-sensitive input component; and a storage device storing at least one module, wherein the at least one module is executable by the one or more processors to:

output, for display at the display component, a graphical keyboard comprising a plurality of keys;

receive an indication of a gesture detected at the presence-sensitive input component;

determine, for respective user states of the one or more user states, respective models that provide at least one value indicating a degree, in a range of degrees, to which the respective user state affects gesture accuracy;

select, based at least in part on the indication of the gesture and the data indicative of the one or more user states, a particular candidate string, wherein, to select the particular candidate string, the at least one module is executable by the one or more processors to:

determine, based on the gesture, a plurality of candidate character strings, wherein each of the plurality of candidate character strings is associated with at least one of a respective physical cost value from a spatial model and a respective lexical cost value from a language model;

adjust, for a particular candidate character string of the plurality of candidate character strings and based at least in part on the one or more user states, at least one of a physical cost value associated with the particular candidate character string and a lexical cost value associated with the particular candidate character string by at least adjusting a relative weight based on the respective models for each of the one or more user states; and select, based at least in part on the adjusting, the particular candidate character string from the plurality of candidate character strings; and output, for display at the display component, the particular candidate string.

11. The computing device of claim 10, wherein the one or more sensors configured to detect the data indicative of the one or more user states further comprise:

one or more sensors configured to detect data indicative of one or more activities engaged in by a user of the computing device while the user performed the gesture, or one or more hand-eye coordination impairment states affecting the user while the user performed the gesture.

12. The computing device of claim 11, wherein the one or more sensors configured to detect the data indicative of the one or more activities engaged in by the user of the computing device comprise a motion sensor for determining the one or more activities.

13. The computing device of claim 10, wherein the one or more hand-eye coordination impairment states affecting the user further include a user temperature condition, wherein the one or more sensors comprise a thermometer for determining an ambient temperature, and wherein the module is further executable the by the one or more processors to:

determine, based on the ambient temperature, the user temperature condition.

14. The computing device of claim 10, wherein, to adjust at least one of the physical cost value associated with the particular candidate character string and the lexical cost value associated with the particular candidate character string, the at least one module is further executable by the one or more processors to:

determine, based at least in part on at least one user state, a weight; and apply the weight to the at least one of the physical cost value associated with the particular candidate character string and the lexical cost value associated with the particular candidate character string.

15. A non-transitory computer-readable storage medium storing instructions that, when executed, cause one or more processors of a computing device to:

output, for display at a display device that is operatively coupled to the computing device, a graphical keyboard comprising a plurality of keys;

receive an indication of a gesture detected at a presence-sensitive input device that is operatively coupled to the computing device;

detect data indicative of one or more user states determined to affect gesture accuracy;

determine, for respective user states of the one or more user states, respective models that provide at least one value indicating a degree, in a range of degrees, to which the respective user state affects gesture accuracy;

select, based at least in part on the indication of the gesture and the data indicative of the one or more user states, a particular candidate string, wherein the instructions that cause the one or more processors to select the particular candidate string comprise instructions that cause the one or more processors to:

determine, based on the gesture, a plurality of candidate character strings, wherein each of the plurality of candidate character strings is associated with at least one of a respective physical cost value from a spatial model and a respective lexical cost value from a language model;

adjust, for a particular candidate character string of the plurality of candidate character strings and based at least in part on the one or more user states, at least one of a physical cost value associated with the particular candidate character string and a lexical cost value associated with the particular candidate character string by at least adjusting a relative weight based on the respective models for each of the one or more user states; and select, based at least in part on the adjusting, the particular candidate character string from the plurality of candidate character strings; and output, for display at the display device, the particular candidate string.

16. The computer-readable storage medium of claim 15, wherein the data indicative of the one or more user states further indicates at least one of one or more activities engaged in by a user of the computing device while the user performed the gesture wherein the one or more activities engaged in by the user include one or more of walking, running, cycling, driving, playing a sport, exercising, and being present aboard a moving apparatus; and wherein the one or more hand-eye coordination impairment states affecting the user further include one or more of a temperature condition, attire worn by the user, and a physiological state.

* * * * *